US011093494B2

(12) United States Patent
He et al.

(10) Patent No.: US 11,093,494 B2
(45) Date of Patent: Aug. 17, 2021

(54) JOINING TABLES BY LEVERAGING TRANSFORMATIONS

(71) Applicant: Microsoft Technology Licensing, LLC, Redmond, WA (US)

(72) Inventors: Yeye He, Redmond, WA (US); Surajit Chaudhuri, Redmond, WA (US); Er Kang Zhu, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 243 days.

(21) Appl. No.: 15/481,055

(22) Filed: Apr. 6, 2017

(65) Prior Publication Data

US 2018/0157706 A1 Jun. 7, 2018

Related U.S. Application Data

(60) Provisional application No. 62/430,823, filed on Dec. 6, 2016.

(51) Int. Cl.
*G06F 16/2453* (2019.01)
*G06F 16/25* (2019.01)
*G06F 16/2455* (2019.01)

(52) U.S. Cl.
CPC .... *G06F 16/24537* (2019.01); *G06F 16/2456* (2019.01); *G06F 16/258* (2019.01)

(58) Field of Classification Search
CPC ............. G06F 16/24537; G06F 16/258; G06F 16/2456
See application file for complete search history.

(56) References Cited

U.S. PATENT DOCUMENTS

| 5,594,898 | A | * | 1/1997 | Dalal | ................. G06F 16/2228 707/696 |
|---|---|---|---|---|---|
| 6,496,819 | B1 | * | 12/2002 | Bello | ................ G06F 16/24537 |
| 6,609,123 | B1 | * | 8/2003 | Cazemier | .............. G06F 16/289 |
| 6,615,220 | B1 | * | 9/2003 | Austin | .................. G06F 16/258 |
| 8,032,546 | B2 | | 10/2011 | Arasu et al. | |
| 8,438,153 | B2 | | 5/2013 | Krishna et al. | |
| 8,799,236 | B1 | * | 8/2014 | Azari | .................. G06F 16/1748 707/688 |
| 8,914,352 | B2 | | 12/2014 | Chaves et al. | |
| 9,275,155 | B1 | | 3/2016 | Smith | |

(Continued)

OTHER PUBLICATIONS

Arasu, et al., "Experiences with using Data Cleaning Technology for Bing Services", In Bulletin of the IEEE Computer Society Technical Committee on Data Engineering, vol. 35, No. 2, Jun. 2012, pp. 14-23.

(Continued)

*Primary Examiner* — Cam Y T Truong
(74) *Attorney, Agent, or Firm* — Merchant & Gould P C

(57) ABSTRACT

Methods and systems for joining two tables are provided. At least two tables to be joined are received. A joinable row pair between the at least two tables is determined. The determined joinable row pair includes a first row from a first table having a common string value with a second row from a second table of the at least two tables. A transformation model is generated from the determined joinable row pair. A column of the first table is transformed based on the generated transformation model. The transformed first table is joined with the second table.

20 Claims, 10 Drawing Sheets

(56) References Cited

U.S. PATENT DOCUMENTS

| | | | |
|---|---|---|---|
| 9,292,571 B1 | 3/2016 | Kiryakov et al. | |
| 9,317,544 B2 | 4/2016 | Ganjam et al. | |
| 2005/0027717 A1* | 2/2005 | Koudas | G06F 16/3347 |
| 2005/0228728 A1* | 10/2005 | Stromquist | G06Q 40/12 |
| | | | 705/30 |
| 2006/0200499 A1* | 9/2006 | Bhatia | G06F 16/86 |
| 2009/0327208 A1* | 12/2009 | Bittner | G06F 16/24564 |
| | | | 706/61 |
| 2010/0082648 A1* | 4/2010 | Potapov | G06F 3/0611 |
| | | | 707/756 |
| 2010/0312769 A1* | 12/2010 | Bailey | G06F 16/95 |
| | | | 707/740 |
| 2010/0312775 A1* | 12/2010 | Haas | G06F 16/2462 |
| | | | 707/759 |
| 2013/0091120 A1* | 4/2013 | Ganjam | G06F 16/2458 |
| | | | 707/714 |
| 2014/0058723 A1* | 2/2014 | Shen | G06F 17/2785 |
| | | | 704/9 |
| 2014/0095502 A1 | 4/2014 | Ziauddin et al. | |
| 2014/0156581 A1* | 6/2014 | Jayaraman | G06N 5/02 |
| | | | 706/46 |
| 2015/0006573 A1* | 1/2015 | Fusume | G06F 17/241 |
| | | | 707/771 |
| 2015/0019216 A1* | 1/2015 | Singh | G06F 16/24578 |
| | | | 704/235 |
| 2015/0220601 A1* | 8/2015 | Leyba | G06F 16/258 |
| | | | 707/706 |
| 2017/0286062 A1* | 10/2017 | Lee | G06F 7/36 |
| 2018/0018367 A1* | 1/2018 | Cui | G06F 16/24534 |

OTHER PUBLICATIONS

Chaudhuri, et al, "A Primitive Operator for Similarity Joins in Data Cleaning", In Proceedings of 22nd International Conference on Data Engineering, Apr. 3, 2006, 12 pages.

"Joining Tables in MySQL", https://www.techotopia.com/index.php/Joining_Tables_in_MySQL, Published on: Oct. 27, 2016, 5 pages.

"Data Preparation (Rev)", https://www.informatica.com/products/data-quality/rev.html, Retrieved on: Nov. 28, 2016, 5 pages.

"Merge queries (Power Query)", https://support.office.com/en-us/article/Merge-queries-Power-Query-fd157620-5470-4c0f-b132-7ca2616d17f9?ui=en-US&rs=en-US&ad=US, Retrieved on: Nov. 28, 2016, 5 pages.

"Trifacta Join Page", https://docs.trifacta.com/display/PE/Join+Page, Published on: Jul. 5, 2016, 7 pages.

Naumann, et al., "Attribute Classification Using Feature Analysis", In Proceedings of 18th International Conference on Data Engineering, Feb. 26, 2002, pp. 1.

Warren, et al., "Multi-column Substring Matching for Database Schema Translation", In Proceedings of Very Large Data Bases Endowment, Sep. 12, 2006, pp. 331-342.

Chen, et al., "Fast Foreign-Key Detection in Microsoft SQL Server PowerPivot for Excel", In Proceedings of 40th International Conference on Very Large Data Bases Endowment, vol. 7, No. 13, Sep. 1, 2014, pp. 1417-1428.

Dasu, et al., "Mining Database Structure; or, How to Build a Data Quality Browser", In Proceedings of ACM SIGMOD International Conference on Management of Data, Jun. 4, 2002, pp. 240-251.

Dhamankar, et al., "iMAP: Discovering Complex Semantic Matches between Database Schemas", In Proceedings of ACM SIGMOD International Conference on Management of Data, Jun. 13, 2004, 12 pages.

Haas, et al., "Clio Grows Up: From Research Prototype to Industrial Tool", In Proceedings of ACM SIGMOD International Conference on Management of Data, Jun. 14, 2005, pp. 805-810.

Hassanzadeh, et al., "Discovering Linkage Points over Web Data", In Proceedings of 39th International Conference on Very Large Data Bases Endowment, vol. 6, No. 6, Aug. 26, 2013, pp. 445-456.

Kohler, et al., "Sampling Dirty Data for Matching Attributes", In Proceedings of ACM SIGMOD International Conference on Management of Data, Jun. 6, 2010, pp. 63-74.

* cited by examiner

302

| President | Popular Vote |
|---|---|
| Barack Obama | 52.93% |
| George W. Bush | 47.87% |
| Bill Clinton | 43.01% |
| George H.W. Bush | 53.37% |
| Ronald Reagan | 50.75% |

304

| President | Approval Rating |
|---|---|
| Obama, Barack (1961-) | 47.0 |
| Bush, George W. (1946-) | 49.4 |
| Clinton, Will (1946-) | 55.1 |
| Bush, George H.W. (1924-) | 60.9 |
| Reagan, Ronald (1911-2004) | 52.8 |

| Name | Title |
|---|---|
| Susan Smith | Principal |
| Melanie Mason | Instructor |
| Pam Payne | Principal |
| Carrie Cash | Admin |
| Kelly Martin | Instructor |

404

| Email | School |
|---|---|
| ssmith@cobb.k12.ga.us | Walton |
| mmason@cobb.k12.ga.us | Nash |
| ppayne@cobb.k12.ga.us | Akron |
| ccash@cobb.k12.ga.us | Sam |
| kmartin@cobb.k12.ga.us | Cook |

| ATU | Manager Alias |
|---|---|
| France.01 | V-JOHN |
| France.03 | JOFORD |
| United States.01 | RICHT |
| United States.02 | MICHM |
| United States.03 | ANDYW |

504

| Sub-ATU | Segment |
|---|---|
| France.01.MIX | SMB |
| United States.01.Government | Major |
| United States.01.Education | AM EPG |
| United States.03.PS-LRG | TM SMS&P |
| United States.04.Retail | AM SMS&P |

| ID | Session Name |
|---|---|
| UBAX01 | AXUG General Session |
| UBAX02 | How2 Session |
| UBAX03 | Mast Planning Session |
| UBAX04 | Financial Reporting |
| UBAX05 | Master Planning Session |

604

| Full Session Name | Month |
|---|---|
| (UBAX01) AXUG General Session | Mar |
| (UBAX02) How2 Session | Apr |
| (UBAX03) Master Planning Session | Apr |
| (UBAX04) Financial Reporting | Oct |
| (UBAX05) Master Planning Session | Dec |

FIG. 6

Algorithm 1 Pseudo code for finding joinable row pair candidates and binary search for optimal $q$

```
 1: function FINDJOINABLEPAIRCANDIDATES(T_s, T_t)
 2:     m ← {}                          ▷q-gram matches
 3:     for all C_s[j] ∈ T_s do
 4:         for all T_s[i, j] ∈ SAMPLEDISTINCT(C_s[j]) do
 5:             v ← T_s[i, j]
 6:             for all C_t[y] ∈ KEYCOLUMNS(T_t) do
 7:                 q ← SEARCHQ(v, C_t[y])
 8:                 if q < 3 or q > LENGTH(v) then
 9:                     continue
10:                 for all g ∈ Q_q(v) do
11:                     r_2 ← QUERYINDEX(C_t[y], g)
12:                     if COUNT(r_2) = 0 then
13:                         continue
14:                     r_1 ← QUERYINDEX(C_s[j], g)
15:                     score = 1/(COUNT(r_1) · COUNT(r_2))
16:                     for all R_t[x] ∈ r_2 do
17:                         m ← ∪{(R_s[i], R_t[x], (j, y), score)}
18:     return SORTBYSCORE(m)
19: function SEARCHQ(v, C_t[y])
20:     a ← 3, b ← LENGTH(v) + 1
21:     while a < b do
22:         h ← a + (b − a)/2
23:         r ← QUERYINDEXALL(C_t[y], Q_h(v))
24:         if COUNT(r) >0 then
25:             a ← h + 1
26:         else
27:             b ← h
28:     return a − 1   ▷ a is the smallest q for COUNT(r) = 0
```

FIG. 7

Algorithm 2 Learn join path and syntactic transformation from groups of joinable row pair candidates grouped by column pairs (j, y)

---

Require: $k$         ▷ Num. of row pairs to user in each group
Require: $r$         ▷ Num. of example sets from each group
Require: $L$        ▷ Max. num. of example sets to gen.
Require: $b$        ▷ Size of an example set 1:   function GENEXAMPLESETS($m$)     ←→∩U▷∈U
2:       $sets \leftarrow \{\}$         ▷Example Sets
3:       for all $g, (j, y) \in$ GROUPBYCOLUMNPAIR($m$) do
4:           $g \leftarrow$ TOPK($g, k$)
5:           for all $set \in$ SUBSETSOFSIZE($g, b, r$) do
6:               $sets \leftarrow sets \cup \{(set, y)\}$
7:               if COUNT($sets$) = $L$ then
8:                   return $sets$   ▷ Reach max. num. of sets
9:       return $sets$
10: function LEARNJOINPATH($m$)
11:      $p \leftarrow \{\}$         ▷ Learned join paths
12:      for all $set, y \in$ GENEXAMPLESETS($m$) do
13:          $t \leftarrow$ TRYLEARNTRANSFORM($set$)
14:          if $t =$ null then
15:              continue     ▷ Failed to learn
16:          $C_{s, new} \leftarrow$ APPLYTRANSFORM($t, T_s$)
17:          $score \leftarrow |C_{s, new} \cap C_t[y]|$
18:          $p \leftarrow p \cup \{C_{s, new}, C_t[y], t, score)\}$
19:      return MAXBYSCORE($p$)     ▷ The best join path

FIG. 8

Algorithm 3 Find the distance threshold that produces the maximum fuzzy set intersection while satisfying the join constraints.

---

Require: $\delta \in (0.0, 1.0)$ ▷ Stopping condition
1:   function OPTIMIZETHRESHOLD($C_{s, new}$, $C_{t, key}$)     ← →∩∪▷∈∪
2:       $score_{best} \leftarrow 0$
3:       $a \leftarrow 0.0, b \leftarrow 1.0$
4:       $t_0 \leftarrow 0.0, t \leftarrow a + (b - a)/2$
5:       while $|t - t_0| > \delta$ do
6:           if CHECKCONSTRAINT($C_{s, new}$, $C_{t, key}$, $t$) then
7:                $score \leftarrow |C_{s, new} \cap_{d, t} C_{t, key}|$
8:                if $score > score_{best}$ then
9:                     $score_{best} \leftarrow score$
10:              $b \leftarrow t$
11:          else
12:              $a \leftarrow t$
13:          $t0 \leftarrow t$
14:          $t \leftarrow a + (b - i)/2$
15:       if $score_{best} > 0$ then
16:          return $t_0$     ▷ Found optimal threshold
17:       return $-1.0$     ▷ No feasible threshold found
18:   function CHECKCONSTRAINT($C_{s, new}$, $C_{t, key}$, $t$)
19:       $matched \leftarrow \{\}$
20:       for all $u \in$ DISTINCT($C_{s, new}$) do
21:           $n' \leftarrow 0$
22:           for all $v \in C_{t, key}$ do
23:               if $d(u, v) \leq t$ then
24:                   if $v \in matched$ then
25:                       return false
26:                 $matched \leftarrow matched \cup \{v\}$
27:                 $n' \leftarrow n' + 1$
28:                 if $n' > 1$ then
29:                   return false
30:       return true

FIG. 9

JOINING TABLES BY LEVERAGING TRANSFORMATIONS

CROSS-REFERENCE TO RELATED APPLICATION

This application claims benefit of U.S. Provisional Patent Application No. 62/430,823 titled "AUTO-JOIN: JOINING TABLES BY LEVERAGING TRANSFORMATIONS" filed on Dec. 6, 2016, the entirety of which is hereby incorporated by reference.

BACKGROUND

Join is an important operator in relational database management and use that connects two or more tables together. For example, for ad-hoc data analysis such as in spreadsheets, users increasingly need to join tables whose join-columns use different representations. In another example, in the case of pairs of spreadsheets, a user may want to perform a join operation such as connecting two tables together by pairing values that have certain relationships. For example, if a first table has a name, John Brown, and a second table has a name John T. Brown, a user may want to join the person name from the first table with the person name from the second table.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to methods and systems for auto-joining tables. Methods and systems described herein determine a joinable row pair between two tables, determine a transformation model from the determined joinable row pair, transform values in one of the two tables based on the determined transformation model, and equi-join the transformed values with the values in the other table. A fuzzy join process is then utilized to handle inconsistencies between data items to complete the auto-join process.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3-6 illustrate example input tables according to aspects of the present disclosure;

FIG. 7 illustrates an algorithm including pseudo code for finding joinable row pair candidates according to aspects of the present disclosure;

FIG. 8 illustrates an algorithm to learn join path and syntactic transformation from joinable row pair candidates according to aspects of the present disclosure;

FIG. 9 illustrates an algorithm to find a distance threshold according to aspects of the present disclosure;

DETAILED DESCRIPTION

Figure 1:
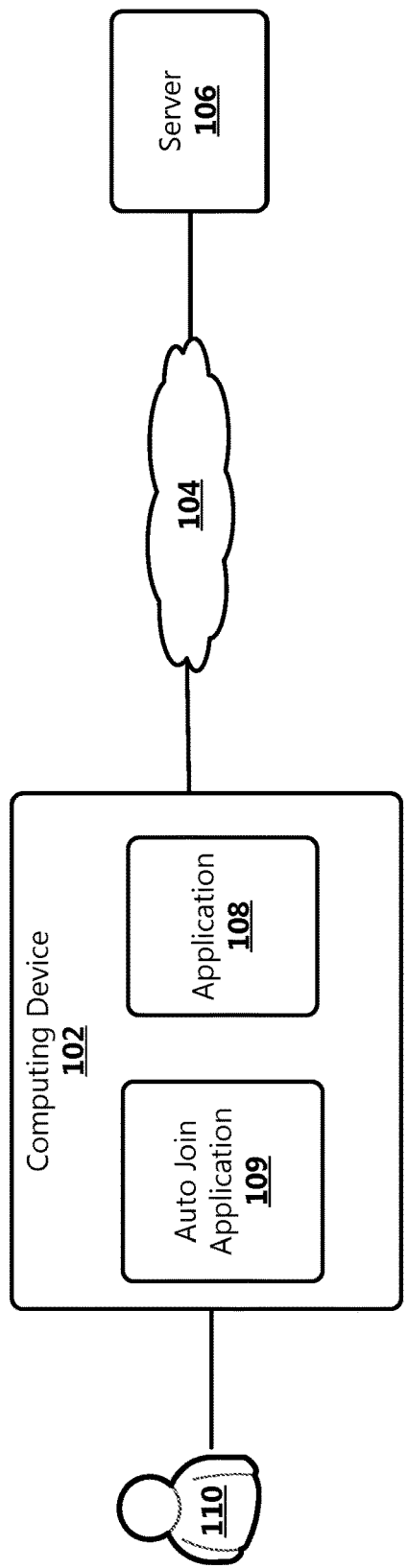
FIG. 1 is a block diagram showing an example operating environment including components of a system for providing auto join functionality.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects are directed to systems methods for joining tables. More specifically, aspects are directed to systems and methods for providing auto-join functionality for generating equi-joinable values between two data tables or structures. According to one aspect the auto-join functionality of the present disclosure automatically searches over a rich data space of transformation operators and enables tables to be equi-joined when executed on input tables. According to aspects, row-level correspondence between data items contained in two data tables or structures (e.g., two spreadsheets, tables or other database structures) is determined. That is, a first step includes joinable row pair between two tables. Next, once combinations of row pairs are determined, a transformation model is determined from the determined joinable row pair. After the transformation model is determined, values in one of the two tables are transformed based on the determined transformation model so that the transformed table can be equi-joined with the values in the other table. A fuzzy join process is then utilized to handle inconsistencies between data items to complete the auto join process.

With reference now to FIG. 1, a block diagram of an example operating environment 100 illustrating aspects of an example system for providing auto-join functionality is shown. As shown in FIG. 1, example operating environment 100 includes an electronic computing device 102. Computing device 102 illustrated in FIG. 1 is illustrated as a tablet computing device; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 10, 11A, 11B, and 12.

Computing device 102 includes an application 108. A user 110 may utilize application 108 on the computing device 102 for a variety of tasks, which may include, for example, to write, calculate, draw, take and organize notes, prepare presentations, and the like. Examples of suitable applications 108 include, but are not limited to, word processing applications, spreadsheet applications, slide presentation applications, and web browser applications. Applications 108 may include thick client applications 108, which are stored locally on computing device 102, or may include thin client applications 108 (i.e., web applications) that reside on a remote server and accessible over a network. A thin client application 108 may be hosted in a browser-controlled environment or coded in a browser-supported language and reliant on a common web browser to render application 108 executable on computing device 102.

According to an aspect, application 108 is operative to communicate with a server 106 over a network 104. Network 104 may be any type of network capable of facilitating communications between computing device 102 and server 106. Examples of such networks include, but are not limited to, LANs, WANs, cellular networks, and/or the Internet. As understood by those skilled in the art, a variety of software applications 108, databases and/or functionalities and data may be stored and/or operated at server 106 and may be accessed by computing device 102. Server 106 includes one or more computing devices, such as such as the computing environment illustrated in FIG. 10. In some examples, server 106 is a distributed server or a cloud server.

According to aspects, computing device 102 includes an auto-join application 109. Auto-join application 109 is a software module, application or device operative to perform the auto-join functionality described herein. As illustrated in FIG. 1, auto-join application 109 may be operated as part of application 108 for performing auto-join operations with respect to data operated by or accessed by application 108. Alternatively, the auto-join functionality may be operated as a standalone software module, application or device at computing device 102 accessible by application 108. Alternatively, the auto-join functionality may be operated at server 106 accessible by application 108 or by other applications that are operative to access functionality at server 106.

In one aspect, auto-join application 109 is operative to perform the operation of combining records from two or more tables together, also referred to as auto-join or an auto-join operation. For example, auto-join application 109 is operative to determine a joinable row pair between two tables, determine a transformation model from the determined joinable row pair, transform values in one of the two tables so that the transformed table can be equi-joined with the values in the other table. For example, the transformed table is joined with the other table using string equality comparisons. The auto-join operation can be used in relational database management systems, as well as other data analysis tools as a power query for spreadsheets.

Most existing systems support an equi-join that uses string equality comparisons. While this equi-join may work well in curated settings such as data warehousing, where data are extensively cleansed and prepared by information technology (IT) through processes known as ETL, it often falls short in scenarios where data are less curated. For example, users 110 often perform one-off, ad-hoc data analysis in spreadsheets, where they need to correlate/join datasets collected from different sources that are formatted differently. Requiring IT to perform ETL for such ad-hoc scenarios is often too slow and expensive.

In some aspects, auto-join application 109 is operative to automate transformation-based joins. For example, indexing techniques are provided to first identify joinable row pairs efficiently, from which auto-join application 109 finds minimum-complexity programs that reduce the problem to equi-joins. In addition, in order to scale auto-join operations to large tables while maintaining interactive speed, auto-join application 109 implements sampling schemes tailored to the specific input tables. The sampling scheme implemented by auto-join application 109 minimizes a number of rows to be sampled from the input tables with a high probability of success. According to aspects, columns of one table are transformed through a sequence of string-based syntactic operations, such that the derived columns can be equi-joined with another table.

Figure 2:
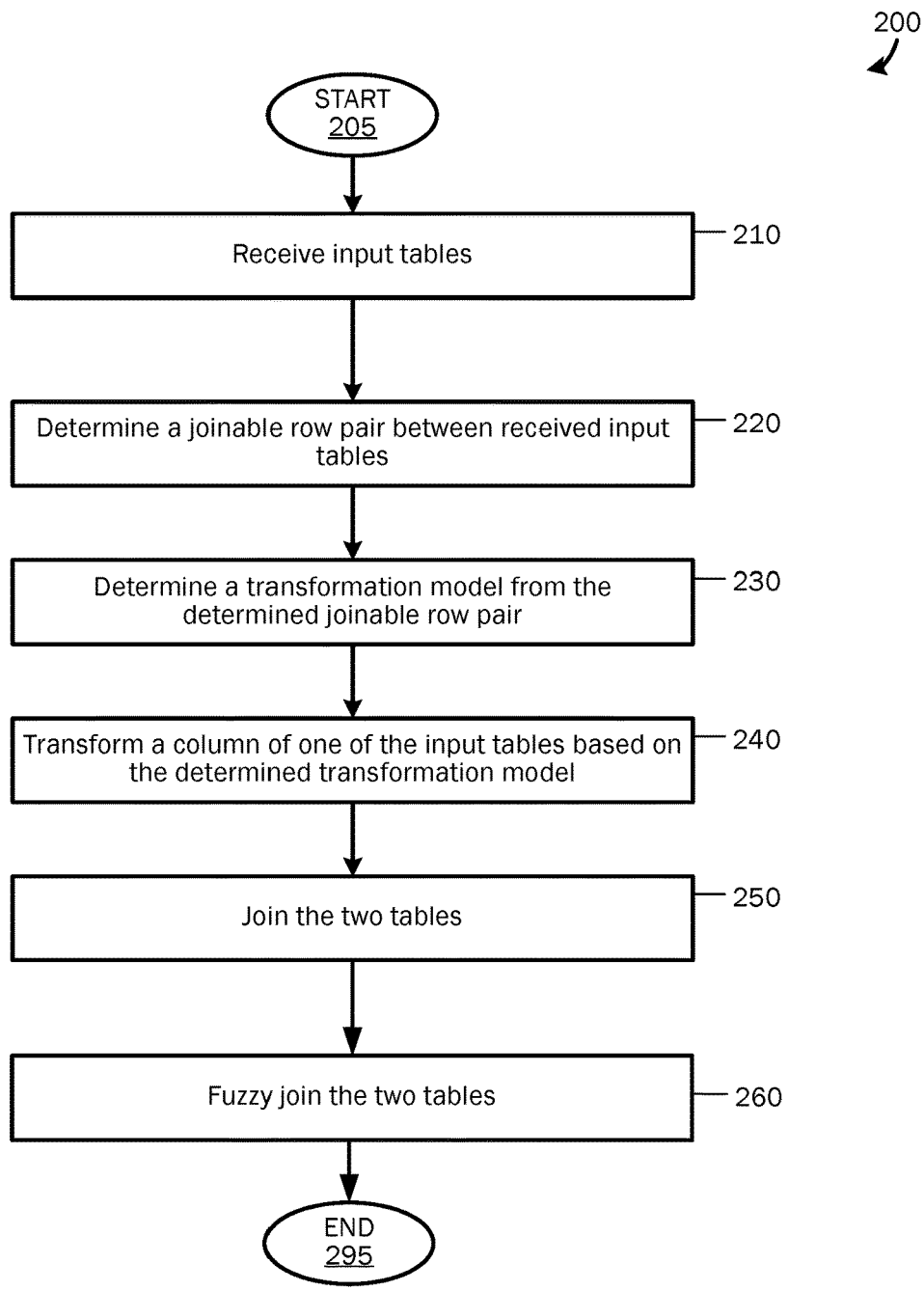
FIG. 2 is a flow chart showing general stages involved in an example method for joining two tables.

FIG. 2 is a flow chart showing general stages involved in an example method 200 for joining two tables. Method 200 begins at START OPERATION 205 and proceeds to OPERATION 210, where input tables to be joined are received. For example, auto-join application 109 receives two or more input tables from user 110 which need to be joined. Each of the received tables includes at least one column. In some aspects, some received tables have more than one column. In some other aspects, the received tables include uniform values in the columns. In other aspects, the received tables include mixed values in the columns.

In some example aspects, the input tables are received in response to a query on a search engine, such as a table search engine. If user 110 gives a query to the table search engine, the table search engine will return a list of tables. For example, user 110 searches for United States Presidents, the table search engine provides a list of tables of the United States Presidents. However, the tables provided by the search engine may use different representations. User 110 may provide such tables as input to tables to join those tables together and correlate information contained in these input tables.

FIG. 3 shows example tables 302 and 304 which may be received by auto-join application 109 for joining. A first table 302 includes two columns. A first column of first table 302 lists United States Presidents. A second column of first table 302 lists popular votes associated with each of the United States Presidents listed in the first column. A second table 304 of FIG. 3 also includes two columns. A first column of second table 304 contains composite values which include a list of the United States Presidents with year of birth and year of death. A second column of second table 304 includes a corresponding job approval rating for the United States Presidents listed in the first column. For example, user 110 has first table 302 in the spreadsheets about US presidents and popular votes they won in elections. User 110 then finds second table 304, for example, from the Internet, that has information about the approval rating for each of the US presidents. User 110 may want to join these two tables 302, 304 to correlate them. However, and as illustrated in FIG. 3, name columns of the two tables 302, 304 use different representations. For example, the first column of first table 302 uses first-name followed by last-name, while the first column of second table 304 uses last-name, comma, first-name, with additional year-of-birth information in parenthesis. As discussed in the following parts of the disclosure, auto-join application 109 is operative to join two tables 302, 304 by determining a correlation between columns of tables 302, 304.

FIG. 4 shows another example of input tables which may be received by auto-join application 109 for joining. For example, input tables 402, 404 are collected from the Internet by user 110. As shown in FIG. 4, first table 402 includes two columns. A first column of first table 402 lists names of teachers. A second column of first table 402 lists titles of the teachers from the first column. Second table 404 of FIG. 4 also includes two columns. A first column of second table 404 lists email addresses. A second column of second table 404 lists names of schools for respective email addresses from the first column. Hence, two tables 402, 404 of FIG. 4 depict an example pair of tables to be joined where first table 402 uses teachers' full names, while second table 404 only has email address. However, the email addresses listed in second table 404 may be generated from the names listed in first table 402. For example, the email address may be generated by concatenating first-initials, last-names, and '@cobb.k12.ga.us'. An email alias may be generated from second table 404 by taking first-initials and concatenating with last names. Hence, there exists a clear join-relationship between example tables 402, 404. As discussed in the following parts of the disclosure auto-join application 109 is operative to determine the join-relationship between columns of input tables, such as tables 402 and 404 of FIG. 4 and join these tables.

In some example embodiments, input tables received for auto-joining may be collected from enterprises. FIG. 5 shows a pair of tables 502, 504 collected from a corpus of datasheet files crawled in a large information technology company. As shown in FIG. 5, a first table 502 includes two columns. A first column of first table 502 lists area team units (ATUs) of the enterprise. A second column of first table 502 lists corresponding manager alias of the ATUs of the first column. Similarly, a second table 504 of FIG. 5 includes two columns. A first column of second table 504 lists sub-ATUs organized under an ATU. A second column of second table 504 lists corresponding segments of the sub-ATUs of the first column.

In some example embodiments, auto-join application 109 is operative to join the first column from first table 502 (ATUs) with the first column of second table 504 (sub-ATUs) in a hierarchical manner. For example, auto-join application 109 is operative to produce the join by taking the first two components of the sub-ATU, which would become equi-join-able with the ATU. Such joining is referred to as is 1:N join since the relationship is hierarchical.

FIG. 6 shows another example of input tables received from enterprise spreadsheets. As shown in FIG. 6, a first table 602 includes a first column listing identities (IDs) and a second column listing corresponding session names. A second table 604 of FIG. 6 includes a first column listing full session names, and a second column listing corresponding months for the sessions. As shown in FIG. 6, the full session names in first column of second table 604 are concatenated full session names. In some embodiments, auto-join application 109 is operative to join tables input 602, 604. For example, auto-join application 109 is operative to automate a discovery of syntactic transformations such that two tables using different representations are joined with the click of a button. In addition to automatically joining such input tables with different representations, auto-join application 109 is operative to make transformation-based join very efficient and at interactive speed.

After receiving input tables at OPERATION 210, method 200 proceeds to OPERATION 220, where a joinable row pair between the input tables is determined. For example, auto join application 109 receives two input tables $T_1$ and $T_2$ as input tables. Auto-join application 109 then identifies one of the two received input tables as a source table and the other as the target table. For example, for input tables $T_1$ and $T_2$, auto-join application 109 may identify table $T_1$ as a source table ($T_s$) and table $T_2$ as a target table ($T_1$). Auto-join application 109 then determines joinable row pair between tables $T_s$ and $T_t$. In some aspects, a joinable row pair is defined as two rows, $R_s$ from $T_s$ and $R_t$ from $T_t$, which can be joined through a syntactic transformation on $R_s$, and the same transformation can be applied to all rows in $T_s$ to solve the syntactic transformation join operation.

In some examples, the joinable row pair is determined using matching of q-grams. The q-grams are a sub-string of length q from an input value. For example, if there is only one occurrence of a unique q-gram between two input tables, then that is an indication that pairs of rows containing the matching q-gram is a joinable row pair. For example, in FIG. 3, there is only one occurrence of "Barack" in both first table 302 and second table 304. Hence, corresponding pair of rows are very likely to be joinable. Determination of joinable row pair using q-grams is discussed in detailed in following parts of the disclosure.

After determining the joinable row pair at OPERATION 220, method 200 proceeds to OPERATION 230, where a transformation model is determined from the joinable row pair. For example, after determining the joinable row pair between the input tables, auto-join application 109 learns a syntactic transformation using the joinable row pairs as ground truth examples. For example, auto-join application 109 is operative to find a hierarchical operator tree by partial maximal match to learn the syntactic transformation.

In one aspect, there exist many possible transformations for one particular joinable row pair. Auto-join application 109 is operative to use multiple examples to constrain a space of feasible programs, and then pick one with minimum complexity to best generalize this transformation. In addition, among all programs derived from the joinable row pair, auto-join application 109 may determine the one that joins the largest fraction of rows as the likely candidate for transformation.

In some example aspects, auto-join application 109 calls a learning function with multiple examples to improve robustness of determining the syntactic transformation. For example, auto-join application 109 groups joinable row pair candidates by their column pair to reduce a probability of different transformations in same example batch. In other example aspects, the syntactic transformation evaluation is done by determining an intersection between a transformation output column and a target key column. In some aspects, auto-join application 109 parallelizes the learning function to reduce overall time. In other aspects, auto-join application 109 limits a total number of times the learning function is called to determine the syntactic transformation. Syntactic relationships are discussed in greater detail in the following parts of the disclosure.

After determining the transformation model at OPERATION 230, method 200 proceeds to OPERATION 240 where a column of one of the input tables is transformed based on the determined transformation model. For example, auto-join application 109 is operative to, using operators from the determined transformation model, transform values of a column of one of the two tables. Transformation of a column using the operators of the determined transformation model generates a new column for the one of the two tables. Transformation of a column using the transformation model is discussed in greater detail in the following parts of the disclosure.

After transforming a column of the one of the input tables at OPERATION 240, method 200 proceeds to OPERATION 250 where the input tables are joined. For example, auto-join application 109 may join the transformed new column of a target table with a column of source table. In some aspects, auto-join application 109 may join the transformed column with existing column using equi-join. For example, auto-join application 109 is operative to join the transformed column with the existing column by using string equality comparisons.

After joining the tables at OPERATION 250, method 200 proceeds to OPERATION 260 where the input tables are fuzzy-joined. For datasets resulting from sources such as the Web, there are often inconsistencies in the string format of entities. An equi-join performed using the derived source column and the target table's key column may miss some rows, resulting in a joined result that is syntactically correct but semantically incomplete. For example, for input tables of FIG. 3, the syntactic transformation in from second table 304 to first table 302 takes a row {"Clinton, Will (1946-)", 55.1} and outputs Will Clinton. However, the matching row in the target column is Bill Clinton. So due to the inconsistency in naming the ex-president, the two rows cannot be equi-joined. Auto-join application 109 is operative to use fuzzy join to deal with such small inconsistencies in the string format. However, choosing the appropriate parameters, such as the token size, distance function, and threshold, can be an issue. Fuzzy join is discussed in detail in the following part of the disclosure. After joining the tables at OPERATION 260, method 200 ends at OPERATION 295.

In one aspect, and as discussed above, auto-join application 109 is operative to use a syntactic transformation to transform a column of a table of input tables to auto-join the input tables. In one aspect, a syntactic transformation is a sequence of operations, applied to a row. For example, a syntactic transformation includes a sequence of operations $o_1\ o_2\ o_3\ \ldots\ o_n$, where $o_i \in \Omega$ is a predefined set of operations. The predefined set of operations are defined as:

$\Omega=\{$Split, Concat, Substring, Constant, SelectK$\}$

In some aspects, the predefined set of operations can be expanded. For example, the predefined set can be expanded to include conditional operations. In one aspect, the predefined set of operations can be expanded by user 110. In another aspect, the predefined set of operations can be expanded automatically during the syntactic transformation. In some aspects, auto-join application 109 is configured to automatically determine the syntactic transformation for a column. Auto-join application 109 is configured to automatically determine the syntactic transformation based on values in the column. For example, in FIG. 3, auto-join application 109 may determine that there is a clear syntactic transformation from the second table 304 to the first column of the first table 302. Step by step operations that are applied to a last row of second table 304 to perform a syntactic transformation are:

1. Input row X with two elements:
{[Obama, Barack (1961-)], [47.0]}
2. Take the first item X[0], Split by "(", produce Y:
{[Obama, Barack, [1961-)]}
3. Take the first item Y [0], Split by ",", produce Z:
{[Obama, Barack]}
4. Takes Substring [1:] from Z[1], produce T:
[Barack]
5. Concat T, a constant string " " and Z[0], produce
[Barack Obama]

In some aspects, these derived values are used by auto-join application 109 to be equi-joined with the first row in the left table in FIG. 3. In addition, and as illustrated above, the same set of transformations apply on other rows in second table 304 to equi-join with the first column of table 302. Similarly, the step by step operations that are applied to a first row of second table 304 to perform a syntactic transformation are:

1. Input→{"Reagan, Ronald (1911-2004)", 52.8}
2. Take the first item, SPLIT by "("→{'Reagan, Ronald", 1911-2004)}
3. Take the first item, SPLIT by "," output list X→{Reagan, Ronald}
4. CONTACT X[1] and X[0], output Y→Ronald Reagan
5. SUBSTRING Y[1:], returns→Ronald Reagan.

In one aspect, auto-join application 109 is operative to automatically discover and/or learn such transformations to enable auto-joins. For example, for two tables $T_s$ and $T_t$, and a predefined set of operators $\Omega$, auto-join application 109 is operative to determine a syntactic transformation program $P=o_1\ o_2\ o_3\ \ldots\ o_n$, where $o_i \in \Omega$, such that $P\ (T_s)$ can be equi-joined with key columns of $T_t$.

In some aspects, each syntactic transformation program P includes a sequence of operators in $\Omega$, where the output of an operator is used as input of the next one. In some aspects, for the purposes of auto-join, the following set of operators may be sufficient for almost all real-world joins.

$\Omega=\{$Split, Concat, Substring, Constant, SelectK$\}$

However, the aforementioned set is configurable, and the set $\Omega$ can be expanded to handle additional operations as needed. For example, user 110 may add one or more operations, such as a conditional operation, in the set. In one aspect, because the syntactic transformation program $P\ (T_s)$ is operative to equi-join with key columns of $T_t$, the types of join are constrained to be 1-to-1 join or n-to-1 join.

In one aspect, input tables are categorized as a source table and a target table, and the syntactic transformations are applied on one of the two tables in order to auto-join with the other. A table of the input tables that is used as input for transformation program $P_1$ is termed as source table $(T_s)$. A table of the input tables whose key columns are joined with the output of $P\ (T_s)$ is termed the target table $(T_t)$. In one aspect, because given two tables auto join application 109 may not know a priori which table should be used as the source and which as the target, auto-join application 109 is operative to generate transformations in both directions. For example, in FIG. 3, second table 304 may be used as the source table, and first table 302 is used as the target table.

In one aspect, in the disclosure, in addition to $T_s$ being the source table and $T_t$ being the target table, $R_s[i]$ is row i in $T_s$ and $R_t[x]$ is row x in $T_t$, $C_s[j]$ is a column j in $T_s$ and $C_t[y]$ is column y in $T_t$, $T_s[i,j]$ is a value at row i and column j in $T_s$; $T_t[x,y]$ is a value at row x and column y in $T_t$; $Q_q(v)$ is a q-gram of a string value v; $Q_q(C_s[j])$ is a multi-set of all q-grams in $C_s[j]$; and $Q_q(C_s[j])$ is a multi-set of all q-grams in $C_s[j]$.

In one aspect, auto-join application 109 is operative to generate joinable row pairs in two-steps. In a first step, auto-join application 109 is operative to determine a row level correspondence. In the second step, auto-join application 109 is operative to learn transformation programs from the determined row level correspondence. For example, if P is a desired transformation program, such that $P(T_s)$ can be equi-joined with $T_t$, pairs of rows that join under this transformation P is termed as joinable row pair. For example, in FIG. 3, the first row of first table 302 and the second table 304 is a joinable row pair. Finding joinable row pairs is critical, because a random row pair has a low probability to join $$\left(\frac{1}{\max\{|T_s|, |T_t|\}}\right).$$

Trying all possibility is too computationally expensive for interactive data exploration.

In one aspect, auto-join application 109 is operative to take two tables as input, without knowing which row from $T_s$ should join with which row from $T_t$. Without such information, generating transformation joins may be inefficient, due to the quadratic combinations of rows that can potentially be joined. So in this first stage, auto-join application 109 is operative to attempt pairs of rows from the two input tables that can potentially join. For example, auto-join application 109 is operative to leverage the observation that unique q-grams are indicative of possible joinable row pairs, and develop a dynamic q-gram indexing/searching scheme for this process. In particular, auto-join application 109 is operative to leverage the observation that the set of operations considered for transformation-join tend to preserve a local q-gram.

In one aspect, a q-gram of a string v, as discussed previously, is a substring of string v with q consecutive characters. A complete q-gram tokenization of v, denoted as $Q_q(v)$, is the set of all q-grams generated for v at all possible starting positions. For example, for string database, a q-gram with 5 consecutive characters is provided as:
$Q_5$(Database)={Datab, ataba, tabas, abase}.

In one aspect, joinable row pairs are determined based on a 1-to-1 q-gram match or an n-to-m g-gram match. For example, if auto-join application 109 finds a unique q-gram that only occurs once in both source table ($T_s$) and ($T_t$), then this pair of rows is very likely to be a joinable row pair. In one aspect, a 1-to-1 q-gram match is a very good indicator of join-ability of two tables. That is, if auto-join application 109 determines a unique 1-to-1 q-gram match from two tables, the determined unique 1-to-1 match is unlikely to be coincidence but a result of certain relationships (e.g., join). For example, given two tables 302 and 304 in FIG. 3, the 6-gram "Barack" appears only once in both tables, and the corresponding rows in these two tables are a joinable row pair. The same is true for q-grams like "Smith" in tables 402 and 404 of FIG. 4, "France.01" in tables 502 and 504 of FIG. 5, and "UBAX01" in tables 602 and 604 of FIG. 6.

To find 1-to-1 q-gram matches, auto join application 109 is operative to build suffix array indices for every column in the source table (only the key columns of the large table) and for each column in the source table, and use all its q-grams to probe the indices. If a q-gram is found only once in a column of the source table and in one of the target table's ($T_1$) key columns, auto-join application 109 outputs the corresponding row pair as a 1-to-1 q-gram match. In order to reduce a number of comparisons, auto-join application 109 is operative to use a fixed-size sample of q-grams from a set of distinct values in the column. For example, if a q-gram $g \in Q_q(T_s[i, j])$ and $g \in Q_q(T_t[x, y])$ has a frequency of 1 in both $Q_q(C_s[j])$ and $Q_q(C_t[y])$, then the row pair $R_s[i]$ and $R_t[j]$ is a 1-to-1 q-gram match.

In one aspect, although 1-to-1 q-gram matches are desirable matches to determine joinable row pairs, there may not exist any 1-to-1 q-gram match between the input tables. For example, the source and target tables may be joinable through a syntactic transformation, but the tuples are all joined n-to-1 which is a valid join. In order the increase coverage of joinable row pairs and generalize to n-to-1 joins, instead of putting hard constraints on 1-to-1, auto-join application 109 is operative to use a scoring function to rank q-gram matches.

For example, if a q-gram $g \in Q_q(T_s[i, j])$ and $g \in Q_q(T_t[x, y])$ has frequency of $n \geq 1$ in $Q_q(C_s[j])$ and has frequency of $n \geq 1$ in $Q_q(Ct[y])$, then the row pair $R_s[i]$ and $R_t[j]$ is a general q-gram match with a score of $1/(n \cdot m)$. In another example, if g is a q-gram with $g \in Q_q(T_s[i, j])$ and $g \in Q_q(T_t[x, y])$, if $F(g, C_s[j])=n \geq 1$ and $F(g, C_t[y])=m \geq 1$, then g is a n-to-m q-gram match between corresponding row pairs (i.e., a g-gram).

In one aspect, compared to 1-to-1 q-gram matches that almost always identify a joinable row pair, a probability that a row pair identified by an n-to-m match is a true joinable row pair is about $$\frac{1}{n \cdot m}.$$

Auto-join application 109 is operative to use $$\frac{1}{n \cdot m}$$

to quantify the "goodness" of a match. In some aspects, good q-grams (with small n and m) may have different values of q for different string values. For example, for input tables 302, 304 of FIG. 3, for a six sub-string q-gram for value "Barack Obama", auto join application 109 gets an ideal 1-to-1 match of "Barack" between the first rows of these two tables 302, 304. However, if auto-join application 109 also uses the six sub-string q-gram for the second row "George W. Bush", then the best it could generate is a 2-to-2 match using the six sub-string q-gram "George" between the second and fourth rows of these two tables, respectively. For "George W. Bush", the ideal q may be a nine sub-string, since the nine sub-string q-gram "George W." could produce a 1-to-1 match. However, if auto-join application 109 uses a nine sub-string q-gram for the first row "Barack Obama", it would fail to generate any match between these two tables.

In one aspect, q (that is, string length of a q-gram) is not set a priori, and auto-join application 109 is operative to try q-grams for all possible q. In other aspects, auto-join application 109 is operative to efficiently find "good" q-gram matches (with small n and m) in order to identify joinable row pairs. For example, and as discussed previously, the best q for different cell value can be different. In one aspect, an example algorithm for finding ideal q-gram matches may include steps of: (1) for every cell from one table, (2) for all possible settings of q, (3) for each q-gram in the resulting tokenization, (4) iterate through all values in the this table to find the number of q-gram matches, denoted as n; (5) iterate through all values in the other table to find the number of q-gram matches, denoted as m. The resulting match is an n-to-m match. However such algorithms may be inefficient and may fail to make the join process interactive.

In one aspect, auto-join application 109 is operative to efficiently determine a good q-gram match for a join operation. For example, auto-join application 109 is operative to build a suffix array index for every column in the source table and each column of the target table, so that instead of using step (4) and (5) as provided in example algorithm above, auto join application 109 is operative to search with a logarithmic complexity. A suffix array index is built by creating a sorted array of the suffixes of all values in a column. Given a query q-gram, matches are found by using binary search over the sorted array and looking for prefixes of the suffixes that match the query exactly. The complexity of probing a q-gram in the index is O(log S), where S is a number of unique suffixes. In one aspect, using the suffix array significantly improves efficiency.

In some aspects, to determine best q efficiently for given a cell value v, a goal is to find an optimal q* that produces the best n-to-m match by the $$\frac{1}{n \cdot m}$$

score (n, m≠0). For example, q* is defined as:

$$q^* = \mathrm{argmax}_q \in [/v/]\mathrm{max} g \in Q_q \frac{1}{(v)nm} \quad \text{(Equation 1)}$$

In equation (1), is the length of string v; n=F(g, $C_s$) and m=F(g, $C_t$) are the number of matches in two columns. In equation (1), as q increases, a quality of the best q-gram for that q is monotonically non-decreasing because the corresponding n and m are non-increasing for a larger q. At the same time, q may not be too large to result in no match. Therefore, the q* can be found as follows.

For example, for columns $C_s$ and $C_t$, value q* is optimal for a cell value v∈$C_s$ in producing q-grams with the best score, when:

$$/Q_q(v) \cap Q_q(C_t)/ \geq 1 \text{ and} \quad \text{(Equation 2)}$$

$$/Q_{q+i}(v) \cap Q_{q+1}(C_t)/ = o \quad \text{(Equation 3)}$$

In short, q is optimal when using q results in at least one match in both columns, while using q+1 results in no match. Auto-join application 109 is operative to use binary search to find the optimal q* for each cell value in $C_s[i]$ in logarithmic rounds.

FIG. 7 provides an algorithm to determine joinable row pair candidates. More specifically, Algorithm 1 of FIG. 7 provides a pseudo code for finding joinable row pair candidates and binary search for optimal q. For example, and as shown in Algorithm 1, auto-join application 109 is operative to, first, build suffix tree indices for all columns of source table ($T_s$) and key columns of target table ($T_t$). The indices are reused for two assignments of $T_s$ and $T_t$. Then, for each column in $T_s$, auto-join application 109 is operative to sample from the set of distinct values in the column, and use the sampled values to generate q-grams. Binary search is used to find the optimal q for each value. Next, auto-join application 109 is operative to use the q-gram to find general q-gram matches between $T_s$ and $T_t$, compute their scores, and output the matches in decreasing order of their scores.

For example, and as shown in Algorithm 1, KeyColumns (T), in Algorithm 1, returns all the single columns that are part of a key column in the table T. Key column detection is implemented by comparing the cardinality of the values in each column with the number of rows in the table—when the cardinality equals the number of rows, it is a key column. QueryIndex(C,g) assumes the existence of a suffix tree index for the column C, and returns a list of rows containing the q-gram g. In Algorithm 1, the suffix tree index caches the query results, since there are many duplicate q-grams. QueryIndexAll(C, $Q_q(v)$) returns the combined results of QueryIndex(C,g) for all g $Q_q(v)$. In one aspect, the joinable pair candidate being output also contains information about the source and target columns (i.e., (j,y)) from which the q-gram match is found. The source and target columns information is used in the next step of selecting examples for syntactic transformation learning For example, given joinable row pairs {($R_s[i]$, $R_t[y]$)} from Algorithm 1 of FIG. 7, auto-join application 109 is operative to generate transformation programs using these as examples. Specifically, auto-join application 109 is operative to view row $R_s[i]$ from the source table $T_s$ as input to a program, and $R_t[y]$ projected on key columns of $T_t$ as desired output. In one aspect, auto-join application 109 is operative to find a program that can produce such an input/output transformation, so that rows from the source table can be joined with keys of the target table.

As discussed previously, the syntactic transformations are generated using the following set of physical operators, 1={Split, SelectK, Concat, Substring, Constant}. The interface of each operator is as follows:

string[ ] Split(string v, string sep)
string SelectK(string[ ] array, int k)
string Concat(string u, string v)
string Substring(string v, int start, int length)
string Constant(string v)

In one aspect, Split operation splits an input string using a separator, SelectK operation selects the k-th element from an array, Concat operation performs concatenation, Constant operation produces a constant string, and Substring operation returns a substring from a starting index position (counting forward or backward) for a fixed length, with appropriate casing.

In one aspect, a space of possible programs that can be generated is all valid programs using the operators above, with a limit T on the number of operators used to bound the search space (e.g., T=16 or 32). The transformation of the last row of second table 304, discussed previously, requires nine instances of these operators, for instance.

In one aspect, while the transformation applied to the last row of second table 304 initially illustrated transformation programs using one joinable row pair for simplicity, in practice, given one joinable row pair there often exist multiple equally plausible programs that can join the pair. For example, for FIG. 3, the input X row has two elements {[Obama, Barack (1961-)], 47.0, and the target output is [Barack Obama]. An additional program that can also produce this output is:

1. Take the first item X[0], Substr[8:6], produce [Barack]
2. Concat with a constant string " ", produce [Barack]
3. Concat again with X[0], Substr[0:5], produce [Barack Obama]

There exists many more such candidate programs consistent with only one input/output example pair. However, most of these programs do not generalize to the whole input tables and cannot produce the desired transformation join. Hence, if auto-join application 109 uses multiple joinable row pairs as input/output examples, the space of possible programs are significantly constrained, such that the incorrect programs will be pruned out. For example, if one just adds the second rows from FIG. 3, as a row pair, with {[Bush, George W. (1946-)], [49.4]} as the input and [George W. Bush] as the output, then the syntactic transformation program discussed above would no longer be valid, as it would produce [eorge Bush,], which cannot be joined with the keys in the other row.

In one aspect, the pruning power grows exponentially with the number of examples used. However, a few examples (3 or 4) are sufficient to generate the desired join program. In some aspects, while the program execution can be decomposed into simple physical operators defined in $\Omega$, from a human's perspective, physical operators do not directly correspond to a logical view of the high-level transformations that are needed to join. For instance, when auto-join application 109 uses {[Obama, Barack (1961-)], [47.0]} as input to produce "Barack Obama" as output, one would naturally view the required program as having three distinct logical steps—extract the component Barack, produce a space " ", extract the component Obama. Note that these logical operations can almost always be translated into combinations of simple physical operators—extracting the first of component of Barack can be implemented as Split by "(" then Split by ",", and finally use a Substring.

In one aspect, to better capture the logical operations that can mimic how humans rationalize the transformation, auto-join application 109 is operative to introduce a set of higher-level logical operators $\Theta$, each of which can be directly composed using physical operators. In one aspect, $\Theta$ is defined as:

$\Theta$={Constant, Substr, SplitSubstr, SplitSplitSubstr}

In one aspect, unlike physical operators, each logical operator returns a string. For example, SplitSubstr is rewritten as a sequence of four operators. That is:

string SplitSubstr(string[ ] array, int k, string sep, int m, int start, int length):=Substring(SelectK(Split(SelectK(array, k), sep), m), start, length).

Using logical operators, auto-join application 109 is operative to define a transformation learning problem as follows: given a set of joinable row pairs R={$(R^i, R^i)/i \in [k]$} that can be equivalently viewed as input/output examples, and a predefined set of logical operations $\Theta$, find a transformation program P=$\theta_1 \cdot \theta_2 \cdot \theta_3 \cdot \ldots \cdot \theta_n$, $\theta_i \in \Theta$, such that: (1) P is consistent with all given examples in R, or for all $i \in [k]$, P ($R^i$) produces K($R^i$), which is $R^i$ projected on some key columns K; and (2) P is the minimum-complexity program among all other programs that are consistent with R.

In one aspect, the transformational learning problem can also be viewed as a search problem, that is, each logical operator used produces a partial output and has a unit cost. Hence, a solution to the transformational learning problem may include reaching a goal state with full output strings required as quickly as possible. That motivates a best-first search algorithm that iteratively expands an existing program by producing a logical operator that produces as much progress towards the goal state as possible. The search will be performed recursively until all left and right substrings are covered by consistent logical programs, or otherwise it backtracks.

For example, Algorithm 1 of FIG. 7 returns a list of q-gram matches sorted in descending order of their scores. To learn the appropriate transformation program, auto-join application 109 is operative to generate input/output example pairs using the output of the previous step. For example, auto-join application 109 is operative to group the q-gram matches by the column pairs from which the matching q-grams are found, making sure that the examples in each group belong to the same transformation. In descending order of the average score, auto-join application 109 is operative to go through each group and take a fixed number of random subsets to create sets of example pairs, each of which is used to learn one transformation program. The final program is selected by finding the one that produces the highest intersection size between the derived source column and the target key column. Since transformation learning can be expensive, it is bound to a total number of sets of example pairs created. An algorithm, that is, Algorithm 2, for learning join path and syntactic transformation from groups of joinable row pair is illustrated in FIG. 8.

In one aspect, a key column in an input table that needs to be joined may be a composite column with multiple segments of information. For example, the first column of second table 304 in FIG. 3 has both the Presidents' names and their life spans. In one aspect, auto-join application 109 is operative to split such composite columns into two or more columns to generate transformations. For example, when both source and target key columns are composite, auto-join application 109 is operative to split composite columns into multiple columns by essentially aligning substrings into multiple sequences across all rows. For instance, auto-join application 109 is operative to split the key column in second table 304 in FIG. 3 into three columns: the last name part before ",", the first name part before "(", and the life span information.

In one aspect, auto-join application 109 is operative to scale the auto-join tables with thousands or even millions of rows, and still be responsive within a few seconds. For example, given two tables $T_s$ and $T_t$, each with millions of rows, building a suffix tree with indexes for millions of records required for q-gram matches, and then probe a million times against such indexes, using current commodity hardware and still at interactive speed will be very slow and resource consuming. In one aspect, auto-join application 109 is operative to sample records from these tables, at the same time ensuring that sufficient number of joinable row pairs with high probability are sampled.

For example, let $N_s$, $N_t$ be the size of the source table and target table, $p_s$, $p_t$ be the sampling rates of these two tables, respectively. Furthermore, let p be the join participation rate, defined as the fraction of records on the primary key side that participate in the ground truth join results. In one aspect, the join participation rate may need to be reasonably high for sampling to succeed. Since p is a parameter that can be tweaked based on requirements, user 110 can conservatively set p to something low (e.g., 1% or 10%).

In one aspect, for large tables, an objective is to minimize a total number of rows that need to be indexed and queried, which is $N_s p_s + N_t p_t$. Furthermore, auto-join application 109 does not need to ensure that joinable row pairs are sampled with high probability. Given that auto-join application 109 is operative to sample $p_t$ from the target table with $N_t$ rows, there are a total of $N_t p_t$ rows selected in expectation. Since the join participation rate is p, at least $N_t p_t p$ rows will participate in join. Because each of them will join with at least one row from the source table, which is further down-sampled with probability $p_s$ and leads to an expectation of at least $\mu = N_t \cdot p_t \cdot p \cdot p_s$. This process can be seen as drawing from random variables with success probability of $p_t p_s p$ for $N_t$ times. In one aspect, X is a random variable to denote the total number of success with $N_t$ trials.

In learning transformation programs, auto-join application 109 normally would need a certain number of examples to successfully generate programs. Let this required number be T. In one aspect, empirically, four examples are sufficient in most cases. A probability that with sampling less than T joinable rows are produced is bounded, or P (X≤T). For example, X can be bounded by as:

$$P(X \le (1-\delta)\mu) \le e^{-\frac{\delta^2 \mu}{2}} \quad \text{(Equation 4)}$$

If $\mu \ge \dfrac{T}{1-\delta}$, or $N_t p_t p p_s > \dfrac{T}{1-\delta}$, a failure probability is bounded as:

$$P(X \le T) \le e^{-\frac{\delta^2 N_t p_t p_s p}{2}} \quad \text{(Equation 5)}$$

For concreteness, let T=4, δ=0.8, then $N_t$, $$p_t p p_s > \frac{T}{1-\delta} = 40.$$

Replacing numbers in Equation (5), P(X) is provided as:

$$P(X \le T) \le e^{-\frac{0.64 \cdot 20}{2}} = e^{-6.4} < 0.0017$$

In other words, if $p_t$ and $p_s$ are set appropriately to sample enough, with very high probability, more than T rows that are enough for transformation learning.

$$\min N_s p_s + N_t p_t \quad \text{(Equation 6)}$$
$$\text{s.t. } N_t p_t p_s p \ge \frac{T}{1-\delta}$$

$$p_t, p_s \in [0, 1] \quad \text{(Equation 7)}$$

In one aspect, auto-join application 109 is operative to solve the optimization problem, for example using Lagrange solution, and obtain closed form solution:

$$p_t = \sqrt{\frac{T}{(1-\delta)pN_s}}, \; p_s = \sqrt{\frac{TN_s}{(1-\delta)pN_t^2}}$$

As a concrete example, suppose two tables both with one million rows. For some fixed setting of δ and T, such as T=4, δ=0.8 as above that guarantees very high success probability, and p=0.1, we can compute the sampling rate as $p_t$=0.014, and $p_s$=0.014, which translates to a sample of 14K rows for both tables—orders of magnitude smaller than the original table sizes. In fact, the sample sizes are:

$$N_t p_t = \sqrt{\frac{TN_t^2}{(1-\delta)pN_s}} \text{ and } N_s p_s = \frac{N_s}{N_t}\sqrt{\frac{TN_s}{(1-\delta)p}}$$

both of which grow sub-linearly as $N_t$ and $N_s$ grow.

In one aspect, auto-join application 109 is operative to calculate the necessary sampling rate $p_t$ and $p_s$ based on the desired values of T, δ, and p to successfully find enough joinable row pairs with high probability, while minimizing the rows that needed to be indexed and probed. The sample rate thus calculated may substantially reduce the computational costs of auto-join operations, and makes it possible to scale this functionality to large tables.

In one aspect, for datasets resulting from sources such as the Web, there are often inconsistencies in the string format of entities. An equi-join performed using the derived source column ($C_{s,new}$) and the target table's key column ($C_{t,key}$) may miss some rows, resulting in a joined result that is syntactically correct but semantically incomplete. For example, the syntactic transformation from second table 304 to first table 302 in FIG. 3 takes the row {"Clinton, Will (1946-)", 55.1} and outputs "Will Clinton." However, the matching row in the target column is "Bill Clinton". So due to the inconsistency in naming the ex-president, the two rows cannot be equi-joined.

In one aspect, auto-join application 109 is operative to use fuzzy join to correct such small inconsistencies in the string format. In another aspect, in a threshold-based fuzzy join, a join algorithm is given a distance function that takes an input of two string values and outputs a normalized distance between 0.0 and 1.0. A source table row is joined with all target table rows for which the distances between the values in the join columns are less than the threshold. In various aspects, auto-join application 109 is operative to provide an optimization strategy to choose the distance threshold for threshold-based fuzzy join.

For example, an objective of the optimization is to maximize a fuzzy set intersection size between $C_{s,new}$ and $C_{t,key}$, similar to the selection criteria for syntactic transformation, as the intersection size is a good indicator for the size of the joined result. In one aspect, the fuzzy set intersection is denoted by $\cap_{d,t}$, which is defined as:

$$C_s,\text{new} \cap_{d,t} C_t,\text{key} = \text{DISTINCT}(\{(u_i,v_x)|d(u_i,v_x) \le t, \\ \forall u_i \in C_{s,new}, \forall v_x \in C_{t,key}\}) \quad \text{(Equation 8)}$$

where d is the distance function used, and t is the distance threshold.

In one aspect, since during auto-join, the source table is joined with the target table's key column, a key-foreign-key join constraint is imposed. For example, in a first constraint, every source row cannot join with more than one target row. In a second constraint, every target row cannot join with more than one distinct source row. Under these constraints, a formal definition of the optimization problem is given as:

$$\arg \max |C_{s,new} \cap_{d,t} C_{t,key}|$$

$$t \in (0.0, 1.0)$$

$$\text{s.t. } |\{v_x|d(u_i,v_x) \le t, \forall v_x \in C_{t,key}\}| \le 1$$

$$|\{u_i|d(u_i,v_x) \le t, \forall v_x \in C_{t,key}\}| \le 1$$

$$\forall u_i \in \text{DISTINCT}(C_{s,new}) \quad \text{(Equation 9)}$$

Considering a distance function d and a small number δ>0, an optimal distance threshold t* for the fuzzy join optimization problem is such that t* satisfies the constraints in Equation (9) but t*+δ does not. Because the objective function |$C_s$,new∩d,tCt,key| and the number of row pairs that can be fuzzy joined both increases monotonically with respect to t, the optimal threshold t* is thus the maximum value of t that can be achieved without breaking the constraints.

The following example illustrates fuzzy join optimization being used for joining tables in FIG. 3. For example, after applying the transformation, the output "Will Clinton" cannot be equi-joined with "Bill Clinton". Using a 3-gram tokenizer, the distance between the two is 0.1. On the other hand, the closest pair that would break the constraints in Equation (9) are "George H. W. Bush" and "George W. Bush", with a distance of 0.3125. Since the fuzzy join optimization finds the maximum threshold that still satisfies the join constraints, the optimal threshold in this case is 0.3125−δ, it allows "Will Clinton" and "Bill Clinton" to be joined, but does not create additional joined pairs that would break the constraints.

In one aspect, due to the monotonicity property of the objective function, auto-join application 109 is operative to use binary search with δ=0.001 to find t*. In other aspect, auto-join application 109 is operative to use distance with a 3-gram tokenizer. A pseudo code for fuzzy join optimization is provided in Algorithm 3 of FIG. 9.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 10:
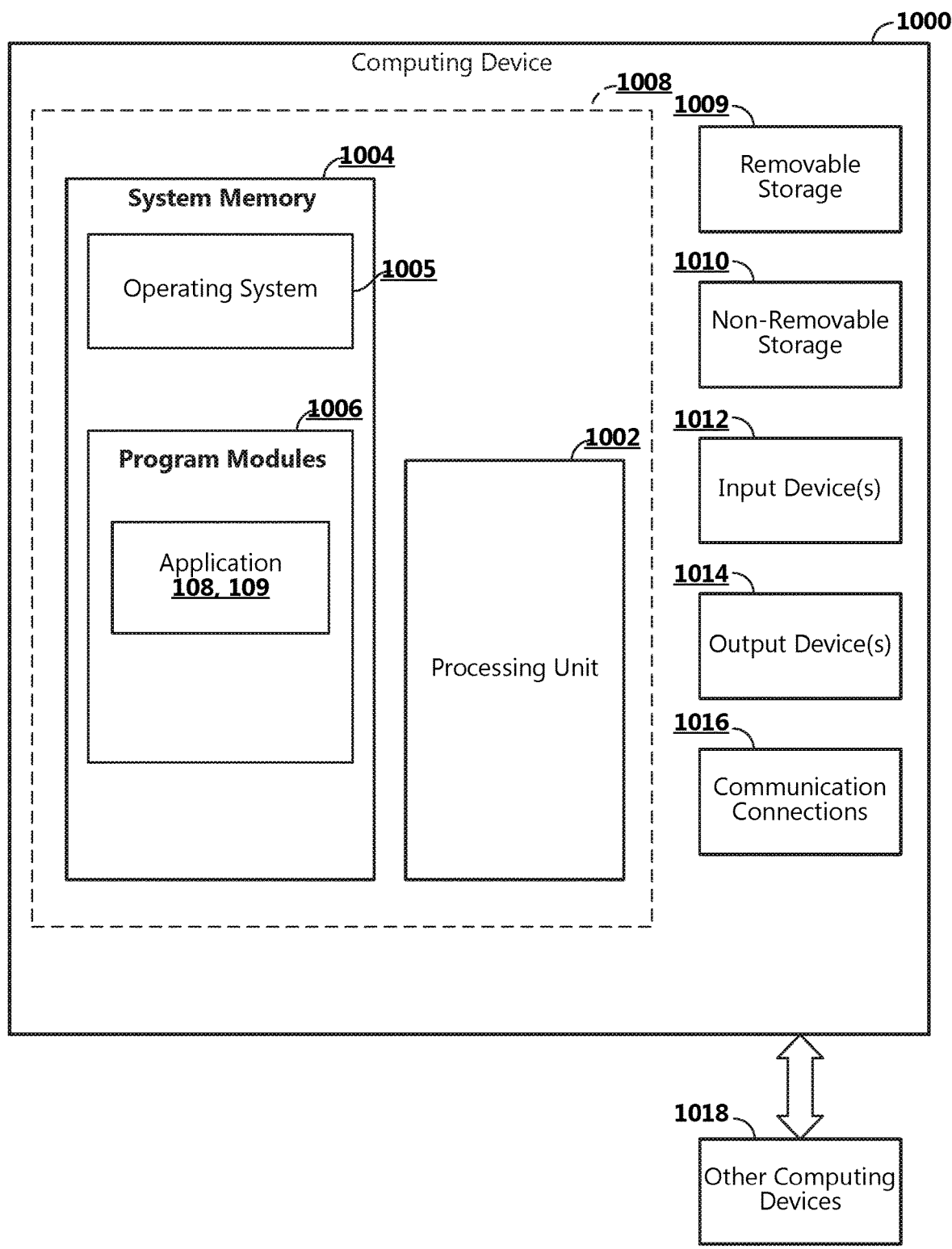
FIG. 10 is a block diagram illustrating example physical components of a computing device.
Figure 11A:
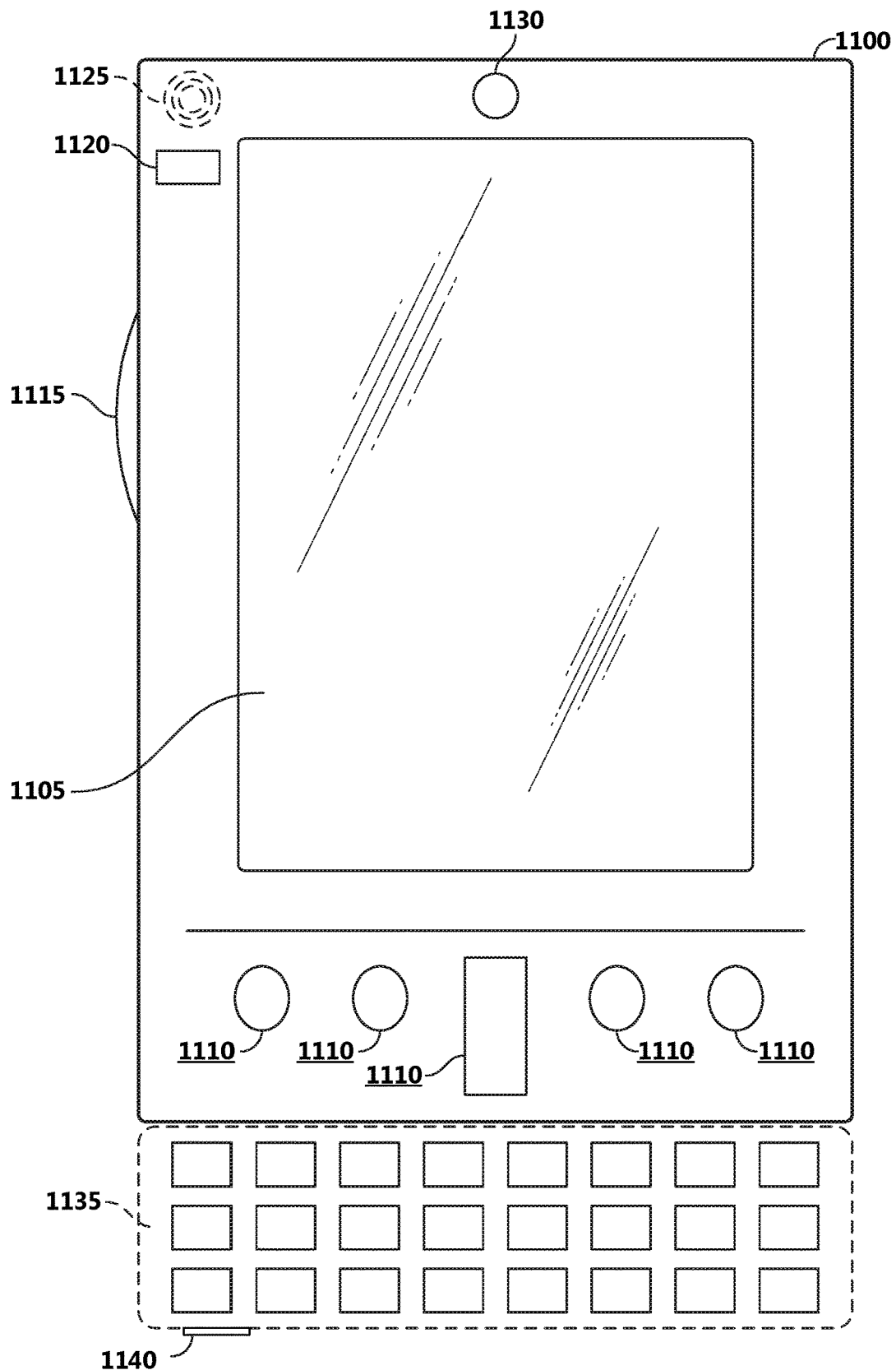
FIGS. 11A and 11B are simplified block diagrams of a mobile computing device.
Figure 11B:
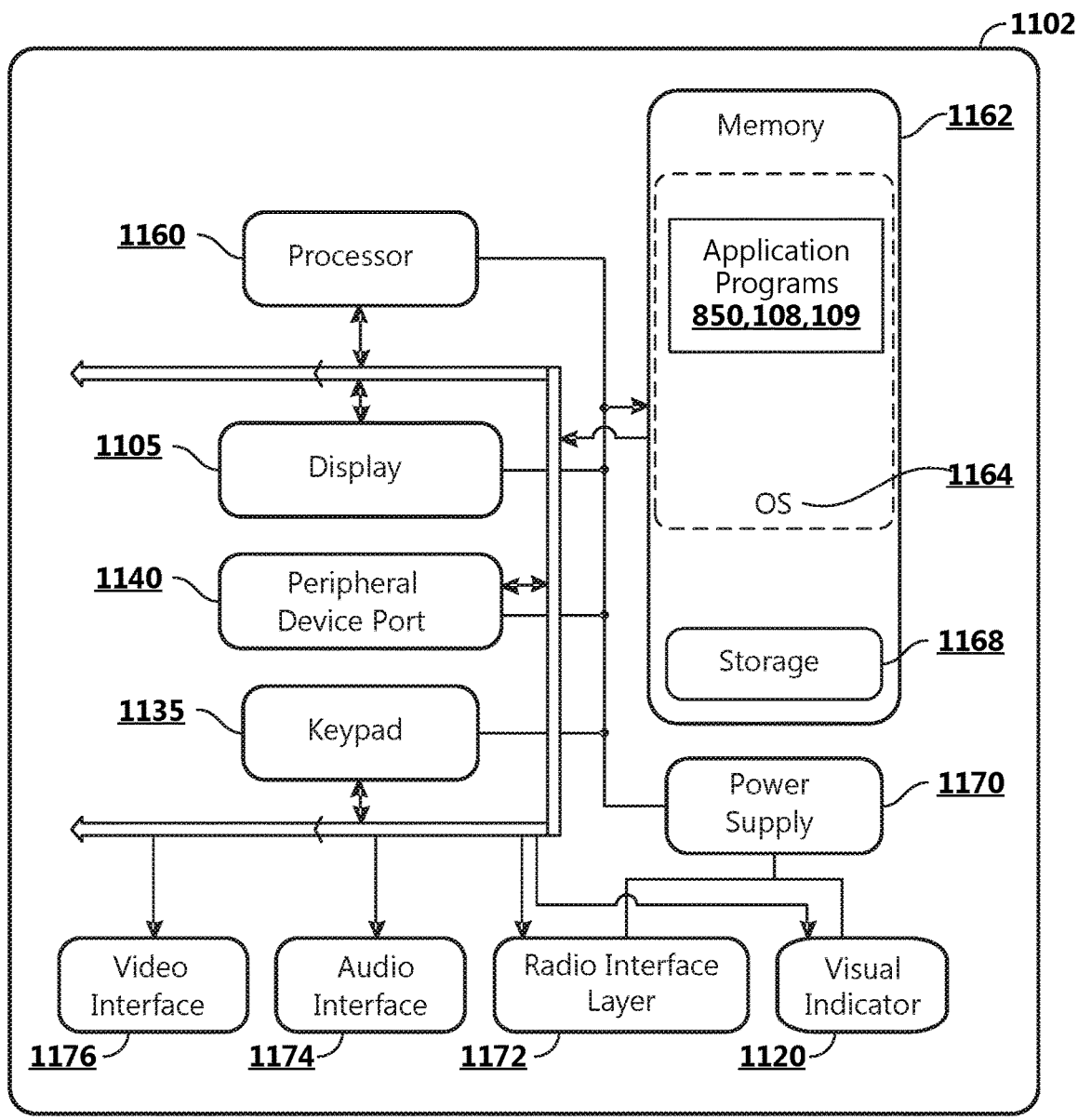
Figure 12:
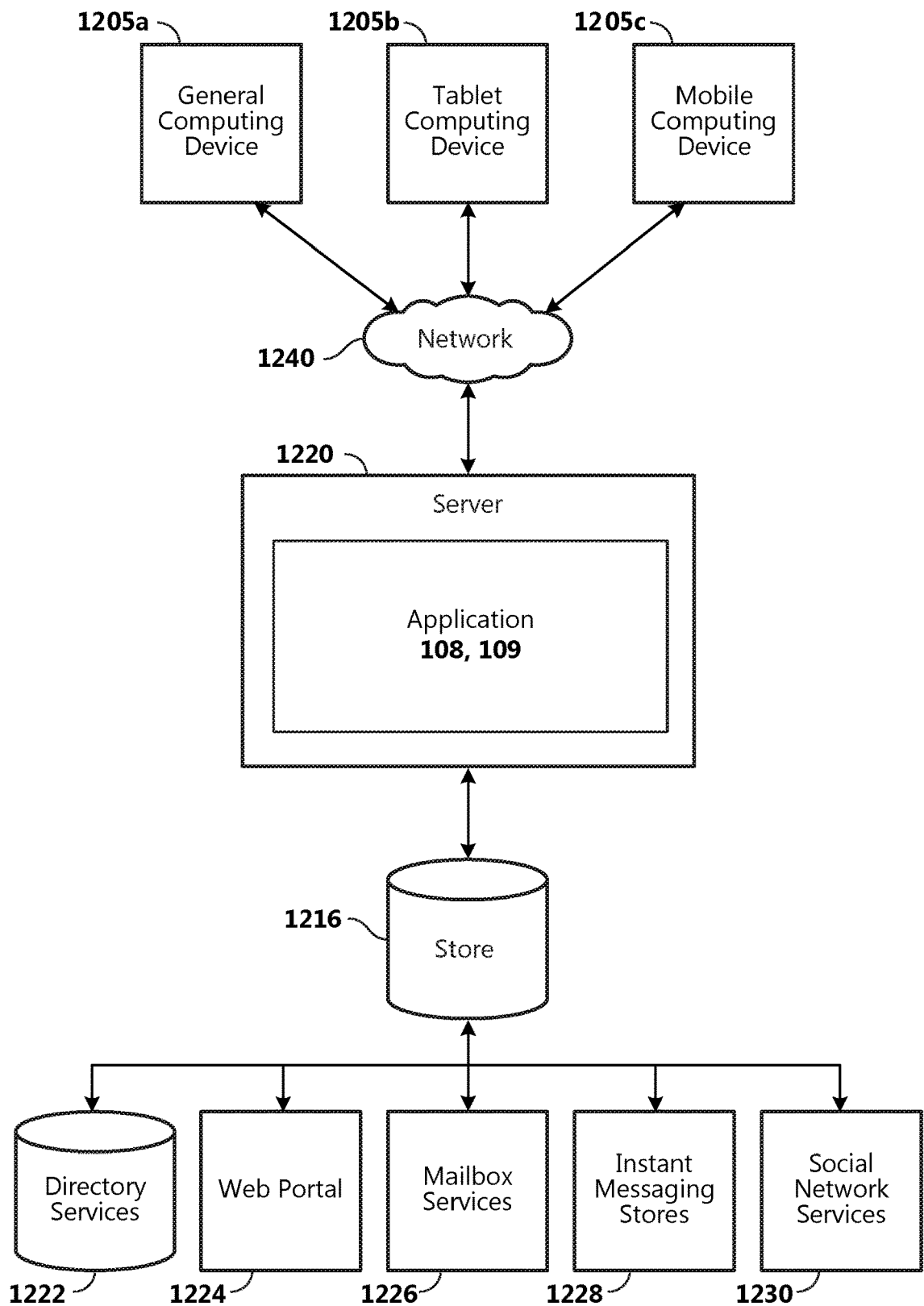
FIG. 12 is a simplified block diagram of a distributed computing system.

FIGS. 10-12 and the associated descriptions provide a discussion of a variety of operating environments in which examples are practiced. However, the devices and systems illustrated and discussed with respect to FIGS. 10-12 are for purposes of example and illustration and are not limiting of a vast number of computing device configurations that are utilized for practicing aspects, described herein.

FIG. 10 is a block diagram illustrating physical components (i.e., hardware) of a computing device 1000 with which examples of the present disclosure may be practiced. In a basic configuration, computing device 1000 includes at least one processing unit 1002 and a system memory 1004. According to an aspect, depending on the configuration and type of computing device, system memory 1004 includes, but is not limited to, volatile storage (e.g., random access memory), non-volatile storage (e.g., read-only memory), flash memory, or any combination of such memories. According to an aspect, system memory 1004 includes an operating system 1005 and one or more program modules 1006 suitable for running software applications 1050. According to an aspect, system memory 1004 includes auto-join application 109. Operating system 1005, for example, is suitable for controlling the operation of computing device 1000. Furthermore, aspects are practiced in conjunction with a graphics library, other operating systems, or any other application program, and is not limited to any particular application or system. This basic configuration is illustrated in FIG. 10 by those components within a dashed line 1008. According to an aspect, computing device 1000 has additional features or functionality. For example, according to an aspect, computing device 1000 includes additional data storage devices (removable and/or non-removable) such as, for example, magnetic disks, optical disks, or tape. Such additional storage is illustrated in FIG. 7 by a removable storage device 1009 and a non-removable storage device 1010.

As stated above, according to an aspect, a number of program modules and data files are stored in the system memory 1004. While executing on the processing unit 1002, program modules 1006 (e.g., auto-join application 109) perform processes including, but not limited to, one or more of the stages of method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 10 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1000 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1000 has one or more input device(s) 1012 such as a keyboard, a mouse, a pen, a sound input device, a touch input device, etc. Output device(s) 1014 such as a display, speakers, a printer, etc. are also included according to an aspect. The aforementioned devices are examples and others may be used. According to an aspect, computing device 1000 includes one or more communication connections 1016 allowing communications with other computing devices 1018. Examples of suitable communication connections 1016 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. System memory 1004, removable storage device 1009, and non-removable storage device 1010 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by computing device 1000. According to an aspect, any such computer storage media is part of computing device 1000. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, a tablet personal computer, a laptop computer, and the like, with which aspects may be practiced. With reference to FIG. 11A, an example of a mobile computing device 1100 for implementing the aspects is illustrated. In a basic configuration, mobile computing device 1100 is a handheld computer having both input elements and output elements. Mobile computing device 1100 typically includes a display 1105 and one or more input buttons 1110 that allow the user to enter information into mobile computing device 1100. According to an aspect, display 1105 of mobile computing device 1100 functions as an input device (e.g., a touch screen display). If included, an optional side input element 1115 allows further user input. According to an aspect, the side input element 1115 is a rotary switch, a button, or any other type of manual input element. In alternative examples, mobile computing device 1100 incorporates more or less input elements. For example, the display 1105 may not be a touch screen in some examples. In alternative examples, the mobile computing device 1100 is a portable phone system, such as a cellular phone. According to an aspect, the mobile computing device 1100 includes an optional keypad 1135. According to an aspect, the optional keypad 1135 is a physical keypad. According to another aspect, the optional keypad 1135 is a "soft" keypad generated on the touch screen display. In various aspects, the output elements include the display 1105 for showing a graphical user interface (GUI), a visual indicator 1120 (e.g., a light emitting diode), and/or an audio transducer 1125 (e.g., a speaker). In some examples, the mobile computing device 1100 incorporates a vibration transducer for providing the user with tactile feedback. In yet another example, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1100 incorporates peripheral device port 1140, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one example of a mobile computing device. That is, the mobile computing device 1100 incorporates a system (i.e., an architecture) 1102 to implement some examples. In one example, the system 1102 is implemented as a "smart phone" capable of running one or more applications (e.g., browser, e-mail, calendaring, contact managers, messaging clients, games, and media clients/players). In some examples, the system 1102 is integrated as a computing device, such as an integrated personal digital assistant (PDA) and wireless phone.

According to an aspect, one or more application programs 1150 are loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. According to an aspect, auto-join application 109 is loaded into memory 1162. System 1102 also includes a non-volatile storage area 1168 within memory 1162. Non-volatile storage area 1168 is used to store persistent information that should not be lost if system 1102 is powered down. Application programs 1150 may use and store information in non-volatile storage area 1168, such as e-mail or other messages used by an e-mail application, and the like. A synchronization application (not shown) also resides on system 1102 and is programmed to interact with a corresponding synchronization application resident on a host computer to keep the information stored in non-volatile storage area 1168 synchronized with corresponding information stored at the host computer. As should be appreciated, other applications may be loaded into memory 1162 and run on mobile computing device 1100.

According to an aspect, system 1102 has a power supply 1170, which is implemented as one or more batteries. According to an aspect, power supply 1170 further includes an external power source, such as an AC adapter or a powered docking cradle that supplements or recharges the batteries.

According to an aspect, system 1102 includes a radio 1172 that performs the function of transmitting and receiving radio frequency communications. Radio 1172 facilitates wireless connectivity between system 1102 and the "outside world," via a communications carrier or service provider. Transmissions to and from radio 1172 are conducted under control of operating system 1164. In other words, communications received by radio 1172 may be disseminated to application programs 1150 via operating system 1164, and vice versa.

According to an aspect, visual indicator 1120 is used to provide visual notifications and/or an audio interface 1174 is used for producing audible notifications via audio transducer 1125. In the illustrated example, visual indicator 1120 is a light emitting diode (LED) and audio transducer 1125 is a speaker. These devices may be directly coupled to power supply 1170 so that when activated, they remain on for a duration dictated by the notification mechanism even though processor 1160 and other components might shut down for conserving battery power. The LED may be programmed to remain on indefinitely until the user takes action to indicate the powered-on status of the device. Audio interface 1174 is used to provide audible signals to and receive audible signals from the user. For example, in addition to being coupled to audio transducer 1125, audio interface 1174 may also be coupled to a microphone to receive audible input, such as to facilitate a telephone conversation. According to an aspect, system 1102 further includes a video interface 1176 that enables an operation of an on-board camera 1130 to record still images, video stream, and the like.

According to an aspect, a mobile computing device 1100 implementing system 1102 has additional features or functionality. For example, mobile computing device 1100 includes additional data storage devices (removable and/or non-removable) such as, magnetic disks, optical disks, or tape. Such additional storage is illustrated in FIG. 11B by the non-volatile storage area 1168.

According to an aspect, data/information generated or captured by mobile computing device 1100 and stored via system 1102 is stored locally on mobile computing device 1100, as described above. According to another aspect, the data is stored on any number of storage media that is accessible by the device via radio 1172 or via a wired connection between mobile computing device 1100 and a separate computing device associated with mobile computing device 1100, for example, a server computer in a distributed computing network, such as the Internet. As should be appreciated such data/information is accessible via mobile computing device 1100 via radio 1172 or via a distributed computing network. Similarly, according to an aspect, such data/information is readily transferred between computing devices for storage and use according to well-known data/information transfer and storage means, including electronic mail and collaborative data/information sharing systems.

FIG. 12 illustrates one example of the architecture of a system for providing a personalized persistent collection of customized inking tools as described above. Content developed, interacted with, or edited in association with auto-join application 109 is enabled to be stored in different communication channels or other storage types. For example, various documents may be stored using a directory service 1222, a web portal 1224, a mailbox service 1226, an instant messaging store 1228, or a social networking site 1230. Auto-join application 109 is operative to use any of these types of systems or the like for providing a personalized persistent collection of customized inking tools, as described herein. According to an aspect, a server 1220 provides auto-join application 109 to clients 1205a,b,c. As one example, server 1220 is a web server providing auto-join application 109 and related functionality and content over the web. Server 1220 provides auto-join application 109 and related functionality and over the web to clients 1205 through a network 1240. By way of example, the client computing device is implemented and embodied in a personal computer 1205a, a tablet computing device 1205b or a mobile computing device 1205c (e.g., a smart phone), or other computing device. Any of these examples of the client computing device are operative to obtain content from store 1216.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for joining tables, the system comprising:
a processor; and
a memory storage device including instructions that when executed by the processor are operable to:
receive a plurality of tables to be joined, the plurality of tables including at least a first table and a second table, wherein a column of the first table and a column of the second table include correlated data represented in a different format in each of the first table and the second table;
determine a joinable row pair between the first table and the second table, wherein the joinable row pair is a row of the first table and a row of the second table, the determined joinable row pair comprising a matching string indicating the correlated data in different formats;
determine a transformation model based on the determined joinable row pair;
transform the first table by transforming the column of the first table using the determined transformation model such that corresponding rows of the column of the first table and the column of the second table include the correlated data represented in a same format; and
join the transformed first table with the second table by:
determining two string values associated with the correlated data from the first table and the second table;
determining a distance between the two string values; and
joining, when the determined distance between the two string values is less than a selected parameter, the transformed first table with the second table, wherein the transformed first table is equi-joined with the second table.

2. The system of claim 1, wherein the matching string is a q-gram comprising q consecutive characters from a starting position, and wherein the joinable row pair comprises a 1-to-1 q-gram match between the first table and the second table.

3. The system of claim 1, wherein the matching string is a q-gram string comprising q consecutive characters from a starting position, and wherein the joinable row pair comprises a dynamic q-gram match between the first table and the second table.

4. The system of claim 1, wherein a syntactic transformation program comprising a predefined set of operations is determined based on the first table, the second table, and the transformation model.

5. The system of claim 4, wherein the predefined set of operations are performed consecutively on rows of the column of the first table to transform the column of the first table.

6. The system of claim 4, wherein the syntactic transformation program includes one or more of a syntactic function, mapping table or web service.

7. The system of claim 1, further comprising fuzzy join the transformed first table and the second table to correct inconsistencies in string format.

8. A computer-implemented method for joining tables, comprising:
receiving, at least a first table and a second table to be joined, wherein the first table and the second table include correlated data represented in a different format in each of the first table and the second table;
determining a joinable row pair between the first table and the second table, wherein the joinable row pair is a row of the first table and a row of the second table that includes a matching string indicating the correlated data in different formats;
generating a transformation model based on the determined joinable row pair;
transforming, based on the generated transformation model, each row of the first table such that a column of the first table and a column of the second table include the correlated data represented in a same format; and
joining transformed first table with the second table by:
determining two string values associated with the correlated data from the first table and the second table;
determining a distance between the two string values; and
joining, when the determined distance between the two string values is less than a selected parameter, the transformed first table with the second table,
wherein the transformed first table is equi-joined with the second table.

9. The method of claim 8, wherein determining the joinable row pair comprises determining a first row of the first table having a one-to-one join correspondence with a second row of the second table.

10. The method of claim 9, wherein determining the first row having the one-to-one join correspondence with the second row comprises determining the one-to-one join correspondence based on a q-gram match between the first row and the second row.

11. The method of claim 10, further comprising determining the q-gram match to determine the one-to-one join correspondence.

12. The method of claim 10, wherein the q-gram match comprises a sub-string of length q from a start point matching between the first row and the second row.

13. The method of claim 8, wherein generating the transformation model based on the determined joinable row pair comprises determining a syntactic transformation program from the joinable row pair, the syntactic transformation program comprising a predefined set of operations to be performed.

14. The method of claim 13, further comprising performing the predefined set of operations on each row of the column of the first table to generate the transformed first table.

15. The method of claim 8, further comprising fuzzy joining the transformed first table and the second table to correct inconsistencies in string format.

16. The method of claim 8, wherein equi-joining the transformed first table with the second table comprises performing string quality comparisons between the transformed first table with the second table.

17. The method of claim 8, wherein joining the transformed first table with the second table comprises receiving the first table comprising a first column having composite values, and splitting the first column into one or more new columns.

18. A computer readable storage device including computer readable instructions, which when executed by a processing unit is operative to join tables, comprising:
receiving at least a first table and a second table to be joined, wherein the first table and the second table include correlated data represented in a different format in each of the first table and the second table;
determining a joinable row pair between the first table and the second table, wherein the joinable row pair is a row of the first table and a row of the second table that includes a matching string indicating the correlated data in different formats;
generating a transformation model based on the determined joinable row pair;
transforming, based on the generated transformation model, each row of the first table such that a column of the first table and a column of the second table include the correlated data represented in a same format; and
joining transformed first table with the second table by:
determining two string values associated with the correlated data from the first table and the second table;
determining a distance between the two string values; and
joining, when the determined distance between the two string values is less than a selected parameter, the transformed first table with the second table,
wherein the transformed first table is equi-joined with the second table.

19. The computer readable storage device of claim 18, wherein the selected parameter is a threshold computed based on the first table and the second table and the two string values.

20. The computer readable storage device of claim 18, wherein the selected parameter is based on a token size.

* * * * *